United States Patent [19]

Caropreso et al.

[11] Patent Number: 4,935,391
[45] Date of Patent: Jun. 19, 1990

[54] PROCESS FOR PREPARING A PURIFIED MINERAL COATING

[75] Inventors: Frank E. Caropreso, Skillman, N.J.; Harry M. Castrantas, Newtown, Pa.; J. Miller Byne, Charlotte, N.C.

[73] Assignee: FMC Corporation, Philadelphia, Pa.

[21] Appl. No.: 331,423

[22] Filed: Mar. 31, 1989

[51] Int. Cl.$^5$ .............................. C04B 20/06
[52] U.S. Cl. .................... 501/146; 106/488; 252/186.21; 252/186.22
[58] Field of Search .......... 106/488; 301/146; 252/186.21, 186.22

[56] References Cited

U.S. PATENT DOCUMENTS

| | | | |
|---|---|---|---|
| 3,086,534 | 4/1963 | De Gorter et al. | 252/186.21 |
| 3,290,161 | 12/1966 | Sheldon et al. | 106/72 |
| 3,353,668 | 11/1967 | Duke | 209/10 |
| 3,489,586 | 1/1970 | Chapman et al. | 106/288 |
| 3,567,474 | 3/1971 | Malden | 106/72 |
| 3,589,922 | 6/1971 | Asdell et al. | 106/288 B |
| 3,616,900 | 11/1971 | Cecil et al. | 209/1 |
| 3,635,744 | 1/1972 | Malden | 106/288 B |
| 3,655,038 | 4/1972 | Mercade | 209/5 |
| 3,861,934 | 1/1975 | Mallary et al. | 106/288 B |
| 3,862,027 | 1/1975 | Mercade | 209/5 |
| 3,868,318 | 2/1975 | Clark et al. | 209/9 |
| 3,923,647 | 12/1975 | Petrovich | 209/166 |
| 3,979,282 | 9/1976 | Cundy | 209/166 |
| 4,174,279 | 11/1979 | Clark et al. | 210/54 |
| 4,186,027 | 1/1980 | Bell et al. | 106/288 B |
| 4,251,351 | 2/1981 | Bowman | 209/5 |
| 4,501,658 | 2/1985 | Young | 209/5 |
| 4,618,374 | 10/1986 | Thompson et al. | 106/288 B |
| 4,752,412 | 6/1988 | Van Antwerp et al. | 252/186.22 |
| 4,824,653 | 4/1989 | Severinghaus, Jr. et al. | 423/430 |

*Primary Examiner*—William R. Dixon, Jr.
*Assistant Examiner*—C. Melissa Bonner
*Attorney, Agent, or Firm*—R. E. Elden; R. L. Andersen

[57] ABSTRACT

A process is provided for purifying finely divided minerals contacting organic material sufficiently to make the minerals useful for coating a filling paper or for use as catalysts, catalyst supports or the like. The process comprises concomitantly contacting an aqueous slurry of the mineral with a peroxygen and a gas containing ozone at a pH from 5 to 12. Preferably, the peroxygen is incorporated into the slurry prior to contacting the slurry with a gas containing ozone. Optionally, the slurry may be pretreated with a chelating agent or subsequently bleached with a reducing agent.

26 Claims, No Drawings

PROCESS FOR PREPARING A PURIFIED MINERAL COATING

A process is provided for purifying finely divided minerals, particularly minerals containing organic material The process purifies the minerals sufficiently for use in coating or filling paper, or as catalysts, catalyst supports and the like.

U.S. Pat. No. 3,589,922 discloses that kaolin clay and other mineral pigments having high brightness values are employed by the paper coating industry. The very bright clay products were obtained by processing sedimentary Georgia kaolin crudes of the soft clay type. Kaolin clays from these soft crudes have a distinctive yellow-orange tinge and are beneficiated by wet-processing including degritting, fractionation, flotation and hydrosulfite bleaching. Soft crudes of the type which have heretofore been the source of 90% plus brightness kaolins are in dwindling supply.

Vast sedimentary deposits of gray kaolin clay crudes are also found in the United States. The clay in these deposits is extremely finely divided and is frequently of remarkably high purity. However, until recently these hard clays were not considered to be suitable for use as pigment grades of kaolin because of the distinct gray color of the clay. Bleaching reagents that have been employed successfully with the soft clays are of little, if any, benefit when applied to the sedimentary Georgia gray kaolins. Another distinctive characteristic of gray kaolins is that they are usually considerably finer than other kaolins and have superior glossing properties. By way of example, in a typical gray Georgia kaolin about 50 percent by weight of the particles are finer than 0.4 $\mu$m as determined by conventional sedimentation procedure, as compared with a white Georgia kaolin crude in which about 50 percent by weight of the particles are finer than 1.5 $\mu$m. It might be logical to expect that gray kaolin could readily be distinguished from white kaolin clay on the basis of chemical analysis. This, however, is not the case, for there exist kaolin clays of substantially identical chemical analysis, inclusive of iron, titania and carbon content; nevertheless, one clay will be distinctly gray and the other one white.

Other minerals, when finely divided, are often employed for coating and filling paper and plastic include talc, chalk, marble, calcium carbonate and zeolites. Frequently, these minerals also have a gray color which must be removed. Such minerals are also employed as catalysts or carriers for catalysts, particularly when the very fine crystals are formed into polycrystalline agglomerates.

It is believed that the gray color of kaolin and other minerals is caused by carbonaceous material such as a humic acid; it is believed that mineral catalysts and catalyst supports are adversely affected by carbonaceous material including humic acids and solvents.

Progress towards the utilization of the gray kaolins has been made by subjecting the clay to froth flotation in the presence of reagents selective to the flotation of some of the colored impurities in the clay (principally a yellowish titania mineral). After flotation of impurities, the purified clay is bleached chemically by treating an aqueous pulp of the gray clay, preferably floated clay, with an oxidizing reagent and then a reducing agent. The preferred oxidizing agent is a permanganate salt, the residue of which is decolorized by the subsequent treatment with a reducing agent according to U.S. Pat. No. 3,353,668.

The oxidizing agents that were tested included oxygen gas, alkali dichromates, sodium chlorate, alkali chlorites, ammonium persulfates, sodium peroxide and hydrogen peroxide. With all of these oxidizing agents the major portion of the bleaching, usually essentially all of the bleaching, occurred after the reducing bleach reagent had been added to the slip of oxidized clay.

A principal drawback of the process is that by-product salts are introduced into the clay. When sufficient permanganate and hydrosulfite were used to produce a 90+ floated clay, the by-product soluble salts adversely affected the rheology of the bleached clay. Since the particles of gray clay are extremely fine, a bleached gray clay filters slowly. It is expensive to wash the clay to an extent sufficient to remove enough salts to overcome the problem resulting from the presence of by-product salts.

U.S. Pat. No. 3,616,900 teaches that ozone can be used as an oxidative bleach to overcome the rheology problems.

U.S. Pat. No. 3,655,038 teaches an improved process for brightening gray kaolin by oxidizing an aqueous slurry (a slip) of the clay with ozone and subsequently removing titanic and other minerals by froth flotation. The patent teaches the brightness of the clay is improved if hydrogen peroxide is added prior to flotation. The patent discloses that the brightness of the kaolin was not improved when treatment with hydrogen peroxide, sodium hypochlorite and sodium chlorite were substituted for ozone but were effective only when added to slurries of gray kaolin immediately prior to flotation.

U.S. Pat. No. 4,743,381 to Bull teaches refractory carbonaceous material, such as cyanide, can be oxidized by activating hydrogen peroxide with a transition metal catalyst supported on a mineral base, such as a molecular sieve. However, for some catalyst applications it may be desirable not to have transition metal residues present.

The present invention is an improved process for oxidizing a carbonaceous material by contacting a finely divided inorganic mineral sufficiently to permit said inorganic mineral to be suitable for use as a coating or filler for paper, as a catalyst, or as a catalyst support by incorporating the inorganic mineral with sufficient aqueous medium to provide an aqueous mixture of about 5 to about 75 parts by weight mineral solids per hundred parts by weight aqueous mixture and contacting said aqueous mixture with a gas comprising ozone, the improvement comprising adjusting the aqueous mixture pH to between 5 and 12, and incorporating an effective amount of a per-oxygen compound into the aqueous mixture and concomitantly contacting said aqueous mixture with a gas comprising ozone, thereby oxidizing carbonaceous material in the inorganic mineral.

The carbonaceous material may be adsorbed on the surface of the mineral, absorbed into the mineral or particulate material intimately mixed with the material.

Desirably, the pH of the aqueous mixture can be adjusted between 5 and 10 and preferably between 7 and 10.

For the purpose of this invention a finely divided mineral is composed of particles ranging in size from about 10 $\mu$m to 0.1 $\mu$m in effective diameter; a finely divided mineral need not be a naturally-occurring mineral but may be a mineral composition such as a synthetic zeolite. Further, the very small size particles may either be dispersed as a slurry, flocculated into dispersable clumps, or agglomerated into large discrete units. For example, the very small particle size of most zeolite crystals is not suitable for use in most applications and, as a result, the crystals must be formed into polycrystalline aggregates in order to be packed into columns and beds for use in adsorption or catalytic processes. Although the average particle size of synthetic zeolite crystals is small (1-5 $\mu$m) the external surface of the crystals is small relative to the internal adsorption void space that becomes available after dehydration of the zeolite. For a spherical particle 1 $\mu$m in diameter, the calculated external surface is about 3 square meters per gram of zeolite. Typical zeolites, after dehydration, have equivalent internal surface areas of 800 square meters per gram.

However, when the inorganic mineral is present in a dispersed or a flocculated form such as gray kaolin clay, a particularly desirable embodiment of the invention may be practiced by slurrying sufficient inorganic mineral in an aqueous medium to provide a slurry having from about 5% to about 75% mineral solids, and contacting said slurry with a gas comprising ozone, the improvement comprising adjusting the pH of slurry to between 5 and 12, and incorporating an effective amount of a peroxygen compound into the slurry with a gas comprising ozone, thereby decreasing the quantity of carbonaceous material in the inorganic mineral. This embodiment is particularly desirable when the inorganic material is a clay, such as gray kaolin, thereby bleaching the gray kaolin clay.

One skilled in the art will readily recognize that the amount of hydrogen peroxide and ozone can be varied over a wide range depending on the amount of oxidation of carbonaceous material or brightness gain desired and the economics of the permissible costs of the process. For example, very superior results may be obtained when 0.02% to 0.2% hydrogen peroxide and 0.1% to 0.3% ozone are used. Greater usage rates, such as 1% hydrogen peroxide and 0.8% ozone may sometimes be required when very high concentrations of carbonaceous material or reducing agents are present, but such high usages may be less economical than desired. However, if only lesser results are acceptable, lesser amounts of hydrogen peroxide and ozone may be employed, such as 0.002% hydrogen peroxide or 0.004% ozone. A practical and economic limit is 0.002% to 0.3% hydrogen peroxide and 0.004% to 0.4% ozone for gray kaolin. For precious metal catalysts supported on an agglomerated inorganic mineral as much as 5% hydrogen peroxide and 3% ozone may be practical. For the purpose of this invention all percents are expressed as percent by weight of the compound based on the total weight of inorganic mineral in the aqueous mixture, and a peroxygen compound is considered to be any compound which yields hydrogen peroxide in solution.

Unexpectedly, it was found that the combination of a peroxygen compound and ozone was more effective than either alone for oxidizing the carbonaceous compound as measured by improving the brightness of the mineral (eliminating the gray). Yellowness is also important for kaolin used for coating or filling paper. Soft kaolin clay is usually bleached with a reducing agent, such as sodium dithionite or hydrosulfite. It was found that after oxidative treatment of a gray kaolin with either a peroxygen compound or ozone, either alone or combined, that some yellowness was observed with samples.

It was observed that the process had an unexpected benefit when practiced on gray kaolin in that the combined ozone and hydrogen peroxide often reduced the yellowness compared to treatment with either hydrogen peroxide or ozone alone, particularly after bleaching with dithionite. The reason for this reduction in yellowness cannot be explained at this time, it may be the result of solubilizing some traces of metal ions associated with the gray kaolin. However, there occasionally was a decrease in brightness (a brightness reversion) which had never been observed before according to the prior art.

It was subsequently found that brightness reversion on treatment with dithionite could be eliminated either by pretreating with a chelating agent or by incorporating a peroxygen into the slurry prior to contacting the slurry with a gas comprising ozone. An added advantage of adding a chelating agent is that it will form a complex with any metal ions, such as iron, which can be solubilized.

The problem of reversion has heretofor not been reported. Presumably it has not been observed previously because most bleaching or oxidizing of kaolin minerals has been directed to bleaching soft (creamy) kaolin with a reducing agent, such as hydrosulfite. U.S. Pat. Nos. 3,589,922; 3,616,900; 3,635,744 and 3,655,038 which teach processes to bleach gray kaolin do not disclose the problem of reversion.

U.S. Pat. No. 3,616,900 discloses that while gray kaolin appears to contain about the same amount of iron as soft kaolin, the iron appears to be bound within the crystal lattice and does not contribute to the color of the kaolin. U.S. Pat. No. 3,655,038 not only teaches that hydrogen peroxide is useful for the flotation of gray kaolin after ozone treatment, and that substitution of hydrogen peroxide for ozone in the bleaching step is ineffective but also the patent teaches that it is critical not to solubilize calcium from the kaolin. In view of the patent it is unexpected that either pretreating a mineral with a chelating agent or employing hydrogen peroxide and ozone concomitantly would be effective steps for bleaching a mineral. In particular, the patent teaches hydrogen peroxide or a peroxygen compound, is effective only when used subsequently to ozone, and then only to assist in flotation.

Any chelating agent may be employed, such as ethylenediamine tetraacetic acid salts, salts of diethylenetriaminepentaacetic acid, 1-hydroxy-ethylidene-1,1-diphosphonate and the like. Pentasodium diethylenetriaminepentaacetate is preferred.

The best method for practicing the present invention will be apparent to one skilled in the art from the following examples. The invention is exemplified using kaolin because the degree of oxidation of carbonaceous material is easily measured by conventional brightness methods. However, it is clear that the invention is effective for the oxidation of carbonaceous material in other minerals and mineral slurries such as calcium carbonate and talc. The yellowness of kaolin was also determined by conventional methods.

GENERAL EXPERIMENTAL PROCEDURE In order to eliminate variables a gray kaolin clay slurry was prepared for all of the examples as follows:

Seven hundred forty-three grams of a 27% slurry of gray kaolin clay in a stainless steel Waring blender was adjusted to the desired pH (usually 5 or 10) using dilute sulfuric acid or sodium hydroxide. Pretreatment additives, if used, were added to the slurry with mixing. Ozone was added continuously over a 30 minute period through a plastic tube attached to an inlet beneath the surface of the aqueous medium in the stainless steel container. If ozone was not used, oxygen was added as a control as it is normally present during the ozonation. The slurry was agitated for 30 minutes. Periodic checks for $H_2O_2$ content were made using EM Quant tabs (Merck and Co). At the end of 30 minutes, the temperature and pH were recorded. During the 30 minute cycle, the temperature rose from 26° C. to 58°–65° C. It appears that a moderate temperature range of 20° C. to 75° C. is suitable for the process, preferably about 50° C. to 65° C.

Immediately after the oxidation, the slurry was treated with alum and dilute sulfuric acid to pH 4 to break the dispersion and make filtration easier. The slurry was divided into two equal portions. One portion was filtered and the wet solids placed in a paper bag for drying. The second portion was treated with 0.5% sodium dithionite ($Na_2S_2O_4$) based on the dry clay. Dithionite treatment was maintained at 60° C. for 30 minutes followed by filtration and placement of the wet solids in a paper bag.

The clay was dried in a microwave oven for approximately 10 minutes to a constant weight. The dried powders were pulverized for a few seconds followed by compression in round molds. Brightness and yellowness measurements were conducted using a Technibrite Micro TB-1C meter. (All percentages are weight percentages based on the weight of dry clay.)

The experimental conditions are shown in Tables I and II.

While a clay slurry of 27% solids was used for the examples, slurries of up to 75% are suitable for treatment with $H_2O_2$-$O_3$ mixtures. As the solids content of the slurry increases, the bleaching due to peroxygen predominates owing to decreasing effectiveness of the $O_3$ at high solids content (gas-solid interface problem).

Controls

Table I contains results of control examples involving no oxidation and oxidation employing ozone or hydrogen peroxide alone, with and without subsequent reductive treatment with dithionite.

Control A was carried out to determine the baseline brightness of the clay without oxidative treatment Neither brightness nor yellowness were significantly altered by reduction with dithionite.

Controls B and C employed ozone alone as the oxidative bleach. Brightness prior to reduction was high both at pH 5 and at pH 10, but yellowness was high (5.12 and 4.81). Upon reduction, yellowness improved but brightness reverted to lower values. At the higher pH the reversion was more pronounced and yellowness was less favorable than at the lower pH.

Controls D and E show little brightness improvement over Control A before or after dithionite. Yellowness improved after reduction in both D and E but was still unacceptably high at 4.91, and pH had little effect on performance of hydrogen peroxide alone.

EXAMPLES 1 AND 2

Table II shows the improved results obtained when $H_2O_2$ was added to ozone treatment. About one third of $H_2O_2$. Hydrogen peroxide was added simultaneously with ozone. Before reductive bleaching brightness equivalent to Controls B and C were obtained. However, yellowness was improved over the controls. After treatment with sodium dithionite ($N_2S_2O_4$) benefits of the $O_3/H_2O_2$ combination were more pronounced. At pH 5 the brightness remained high after dithionite treatment, 1.36 points higher than with $o_3$ alone. Yellowness was also markedly improved over the control. At pH 10 the improvement in yellowness over $O_3$ alone was dramatic with a 1.72 point yellowness decrease. The detrimental effect of higher pH on yellowness observed in Controls B and C was not found when the combination of ozone and peroxide was used. Additionally, a 1 point brightness improvement at pH 10 remained after reduction compared to Control C. Examples 1 and 2 illustrate several benefits of the $O_3/H_2O_2$ combination: reduced ozone consumption, improved brightness, and lower yellowness of clay.

EXAMPLES 3 AND 4

The addition of hydrogen peroxide prior to ozone introduction shows unexpected advantages. Table II shows results when hydrogen peroxide was added 30 minutes prior to ozone. At both pH 5 and 10 high brightness values of 85.03 and 84.58, respectively, were obtained. At both pH levels brightness increased after dithionite treatment to levels higher than those obtained with ozone alone, before or after dithionite treatment. In addition the yellowness after reduction was equal to or better than the controls at the same pH.

EXAMPLES 5 AND 6

Table II also presents results of the presence of a chelating agent during bleaching. With the simultaneous addition of $H_2O_2$ and $O_3$, the presence of diethylenetriaminepentaacetic acid yielded very high brightness after reductive treatment, 85.89 and 86.29 at pH 5 and 10, respectively. Low yellowness values were also obtained, lower than the $O_3$ alone controls and lower than most $O_3/H_2O_2$ examples.

EXAMPLES 7 AND 8

The general procedure employed in Examples 1 and 2 was repeated using 0.22 g $H_2O_2$ and 0.5 g ozone at pH 5 (Example 7) and pH 10 (Example 8). The brightness of clay in Example 7 was 85.66 before dithionite treatment and only 82.22 after; yellowness decreased from 4.73 to 3.72. The brightness in Example 8 decreased from 85.34 to 82.56; yellowness increased from 4.73 to 4.77. This illustrates the hitherto unrecorded reversion of brightness with dithionite treatment which is avoided by the process of Examples 3 and 4. However, Examples 7 and 8 indicate dithionite bleaching may not be required.

The bleaching efficacy of dithionite (either sodium or zinc) is known to be a function of the amount of dithionite employed. The present process is capable of reducing the amount of dithionite required as shown by prospective Examples 9 to 11.

EXAMPLE 9

The procedure for Example 2 is followed up to the point of dithionite addition, with only 0.25 wt % dithionite as sodium dithionite on the weight of dry clay, half the amount used in Example 2. A 1.1 point improvement in brightness will be observed over Example 2, and also a 0.5 point decrease in yellowness.

EXAMPLE 10

The procedure for Example 4 is followed with only 0.25 wt % sodium dithionite on the weight of dry clay, half the amount of dithionite used in Example 4. The final brightness will be 85.2, a 0.6 point improvement over a clay not treated with dithionite but half the 1.2 point improvement actually observed in Example 4. The yellowness value is 4.3, a 0.5 point improvement over no dithionite. The value of using less dithionite in this case is that the degree of brightness and yellowness desired can be adjusted by controlling the amount of dithionite used.

EXAMPLE 11

The procedure for Example 1 is followed, but instead adding 0.25 wt % sodium dithionite on the weight of dry clay. This is half the amount of dithionite used in Example 1. The final brightness after dithionite treatment will be 85.5, an improvement over no dithionite treatment and only a modest decrease from 85.9 the brightness obtained with double the amount of dithionite used in example 1. The yellowness will be 4.2, a lower yellowness than obtained without dithionite.

TABLE I

OXIDATION OF GRAY KAOLIN

| Con- | g, oxidant | | | Brightness | | Yellowness | |
|---|---|---|---|---|---|---|---|
| trol | $H_2O_2$ | $O_3$ | pH | Before $Na_2S_2O_4$ | After $Na_2S_2O_4$ | Before $Na_2S_2O_4$ | After $Na_2S_2O_4$ |
| A | 0.0 | 0.0 | 5 | 80.03 | 80.79 | 5.47 | 5.21 |
| B | 0.0 | 0.5 | 5 | 85.59 | 84.53 | 5.12 | 3.63 |
| C | 0.0 | 0.5 | 10 | 85.52 | 82.24 | 4.81 | 4.91 |
| D | 0.36 | 0.0 | 5 | 81.72 | 82.22 | 5.53 | 4.91 |
| E | 0.36 | 0.0 | 10 | 82.14 | 81.76 | 5.41 | 4.88 |

743 g of a 27% w/w kaolin slurry with and without 0.5% w/w $Na_2S_2O_4$ treatment

TABLE II

OXIDATION OF GRAY KAOLIN

| Con- | g, oxidant | | | Brightness | | Yellowness | |
|---|---|---|---|---|---|---|---|
| trol | $H_2O_2$ | $O_3$ | pH | Before $Na_2S_2O_4$ | After $Na_2S_2O_4$ | Before $Na_2S_2O_4$ | After $Na_2S_2O_4$ |
| 1 | 0.14 | 0.3 | 5 | 85.06 | 85.89 | 4.25 | 4.12 |
| 2 | 0.14 | 0.3 | 10 | 85.56 | 83.29 | 4.13 | 3.19 |
| 3* | 0.22 | 0.5 | 5 | 85.03 | 85.64 | 4.79 | 3.67 |
| 4* | 0.22 | 0.5 | 10 | 84.58 | 85.78 | 4.77 | 3.94 |
| 5** | 0.22 | 0.5 | 8.8 | 81.96 | 85.89 | 5.26 | 3.62 |
| 6** | 0.22 | 0.5 | 7.9 | 82.33 | 86.29 | 5.09 | 3.87 |

*hydrogen peroxide incorporated 30 minutes prior to ozone; in all others hydrogen peroxide and ozone incorporated at substantially the same time.
**6.3 g chelating agent
743 g of a 27% w/w kaolin slurry with and without 0.5% w/w $Na_2S_2O_4$ treatment

We claim:

1. In a process for oxidizing a carbonaceous material contacting a finely divided inorganic mineral sufficiently to permit said inorganic mineral to be suitable for use as a coating or filler for paper, as a catalyst, or as a catalyst support by incorporating the inorganic mineral into sufficient aqueous medium to provide an aqueous mixture having from about 5 to about 75 parts by weight mineral solids per hundred parts by weight aqueous mixture, and contacting said aqueous mixture with a gas comprising ozone, the improvement comprising adjusting the pH of the aqueous mixture pH to between 5 and 12, incorporating an effective amount of a peroxygen compound into the aqueous mixture and contacting said aqueous mixture with a gas comprising ozone, thereby oxidizing carbonaceous material sufficiently to permit said inorganic material to be suitable for use as a coating or filler for paper, as a catalyst, or as a catalyst support.

2. The process of claim 1 wherein the peroxygen compound is incorporated into the aqueous mixture prior to contacting the aqueous mixture with a gas comprising ozone.

3. The process of claim 1 wherein sufficient inorganic mineral is incorporated into an aqueous medium to provide an aqueous mixture having about 20 to about 60 parts mineral solids per hundred parts of aqueous mixture.

4. The process of claim 1 wherein the pH of the aqueous mixture is adjusted to between 5 and 10.

5. The process of claim 2 wherein the pH of the aqueous mixture is adjusted to between 5 and 10.

6. The process of claim 3 wherein the pH of the aqueous mixture is adjusted to between 5 and 10.

7. In a process for bleaching a gray kaolin clay to permit said clay to be suitable for use as a coating or filler for paper by slurrying sufficient clay in an aqueous medium to provide a slurry having from about 5% to about 75% clay solids, and contacting said slurry with a gas comprising ozone, the improvement comprising adjusting the pH of slurry to between 5 and 12, incorporating an effective amount of a peroxygen compound into the slurry and contacting said slurry with a gas comprising ozone, thereby bleaching the clay to be suitable for use as a coating or filling for paper.

8. The process of claim 7 wherein the peroxygen compound is incorporated into the slurry prior to contacting the slurry with a gas comprising ozone.

9. The process of claim 7 wherein an effective amount of a chelating agent is incorporated into the slurry to prevent reversion on subsequent treatment with dithionite.

10. The process of claim 7 wherein sufficient inorganic mineral is incorporated into an aqueous medium to provide a slurry having about 20% to about 60% mineral solids.

11. The process of claim 7 wherein the pH of the slurry is adjusted to between 5 and 10.

12. The process of claim 8 wherein the pH of the slurry is adjusted to between 5 and 10.

13. The process of claim.9 wherein the pH of the slurry is adjusted to between 5 and 10.

14. The process of claim 10 wherein the pH of the slurry is adjusted to between 5 and 10.

15. The process of claim 7 wherein the pH of the slurry is adjusted to between 7 and 10.

16. The process of claim 8 wherein the pH of the slurry is adjusted to between 7 and 10.

17. The process of claim 9 wherein the pH of the slurry is adjusted to between 7 and 10.

18. The process of claim 10 wherein the pH of the slurry is adjusted to between 7 and 10.

19. The process of claim 7 wherein 0.02% to 0.2% by weight hydrogen peroxide is incorporated into the slurry based on the weight of mineral solids.

20. The process of claim 8 wherein 0.02% to 0.2% by weight hydrogen peroxide is incorporated into the slurry based on the weight of mineral solids.

21. The process of claim 9 wherein 0.02% to 0.2% by weight hydrogen peroxide is incorporated into the slurry based on the weight of mineral solids.

22. The process of claim 10 wherein 0.02% to 0.2% by weight hydrogen peroxide is incorporated into the slurry based on the weight of mineral solids.

23. The process of claim 7 wherein 0.1% to 0.3% by weight ozone is provided based on the weight of slurry.

24. The process of claim 8 wherein 0.1% to 0.3% by weight ozone is provided based on the weight of slurry.

25. The process of claim 9 wherein 0.1% to 0.3% by weight ozone is provided based on the weight of slurry.

26. The process of claim 10 wherein 0.1% to 0.3% by weight ozone is provided based on the weight of slurry.

* * * * *